(12) United States Patent
Katayama

(10) Patent No.: US 10,817,183 B2
(45) Date of Patent: Oct. 27, 2020

(54) INFORMATION PROCESSING APPARATUS AND INFORMATION PROCESSING SYSTEM

(71) Applicant: FUJITSU LIMITED, Kawasaki-shi, Kanagawa (JP)

(72) Inventor: Kentaro Katayama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 3 days.

(21) Appl. No.: 16/023,689

(22) Filed: Jun. 29, 2018

(65) Prior Publication Data
US 2019/0018599 A1 Jan. 17, 2019

(30) Foreign Application Priority Data

Jul. 11, 2017 (JP) .................................. 2017-135379

(51) Int. Cl.
| | |
|---|---|
| *G06F 3/06* | (2006.01) |
| *G06F 12/00* | (2006.01) |
| *G06F 13/00* | (2006.01) |
| *G06F 12/06* | (2006.01) |
| *G06F 12/0875* | (2016.01) |
| *G06F 9/38* | (2018.01) |
| *G06F 9/30* | (2018.01) |

(52) U.S. Cl.
CPC .......... *G06F 3/0613* (2013.01); *G06F 3/0659* (2013.01); *G06F 3/0673* (2013.01); *G06F 9/30087* (2013.01); *G06F 9/3834* (2013.01); *G06F 12/06* (2013.01); *G06F 12/0875* (2013.01); *G06F 2212/1016* (2013.01)

(58) Field of Classification Search
CPC .... G06F 3/0613; G06F 3/0659; G06F 3/0673; G06F 12/06

USPC ......................................................... 711/169
See application file for complete search history.

(56) References Cited

U.S. PATENT DOCUMENTS

| | | | |
|---|---|---|---|
| 5,715,430 A | 2/1998 | Hirayama | |
| 6,438,651 B1 * | 8/2002 | Slane | G06F 12/0875 710/39 |
| 6,466,988 B1 | 10/2002 | Sukegawa et al. | |
| 6,801,927 B1 * | 10/2004 | Smith | H04L 47/10 709/202 |

(Continued)

FOREIGN PATENT DOCUMENTS

| | | |
|---|---|---|
| JP | 07-295884 | 11/1995 |
| JP | 2000-194680 | 7/2000 |
| JP | 2012-528399 | 11/2012 |

*Primary Examiner* — Mohamed M Gebril
(74) *Attorney, Agent, or Firm* — Fujitsu Patent Center

(57) ABSTRACT

An information processing system includes a first processor that issues a first write request group including a plurality of data write requests for writing first data to a memory. The first processor issues a first completion write request after issuing the first write request group. The first completion write request is a request for writing completion information to the memory. The completion information indicates completion of write processing requested by the first write request group. The first processor inserts a first barrier instruction into the issued requests, between the first write request group and the first completion write request. The first processor outputs all of the plurality of data write requests included in the first write request group, subsequently outputs the first barrier instruction, and subsequently outputs the first completion write request.

8 Claims, 13 Drawing Sheets

(56) References Cited

U.S. PATENT DOCUMENTS

| | | | |
|---|---|---|---|
| 2004/0019729 A1* | 1/2004 | Kelley | G06F 13/4036 |
| | | | 710/306 |
| 2005/0251622 A1* | 11/2005 | Arimilli | G06F 9/3834 |
| | | | 711/118 |
| 2010/0306470 A1* | 12/2010 | Speier | G06F 13/1621 |
| | | | 711/122 |
| 2011/0125944 A1* | 5/2011 | Riocreux | G06F 13/1621 |
| | | | 710/107 |
| 2014/0059270 A1* | 2/2014 | Zaltsman | G06F 13/28 |
| | | | 711/103 |
| 2017/0364262 A1* | 12/2017 | Roberts | G06F 3/0688 |
| 2018/0260160 A1* | 9/2018 | Sherlock | G06F 3/067 |
| 2018/0300235 A1* | 10/2018 | Hu | G06F 3/0688 |
| 2019/0012222 A1* | 1/2019 | Sherlock | G11C 29/50016 |

* cited by examiner

| | 301 | 302 | 303 | 132a |
|---|---|---|---|---|
| | 0 | — | — | |
| 300 | 1 | blk0 ADDRESS | blk0 SIZE | ← RP1 = 1 |
| | 1 | blk1 ADDRESS | blk1 SIZE | |
| | 1 | blk2 ADDRESS | blk2 SIZE | |
| | 0 | — | — | ← WP1 = 4 |
| | ⋮ | ⋮ | ⋮ | |
| | 0 | — | — | |

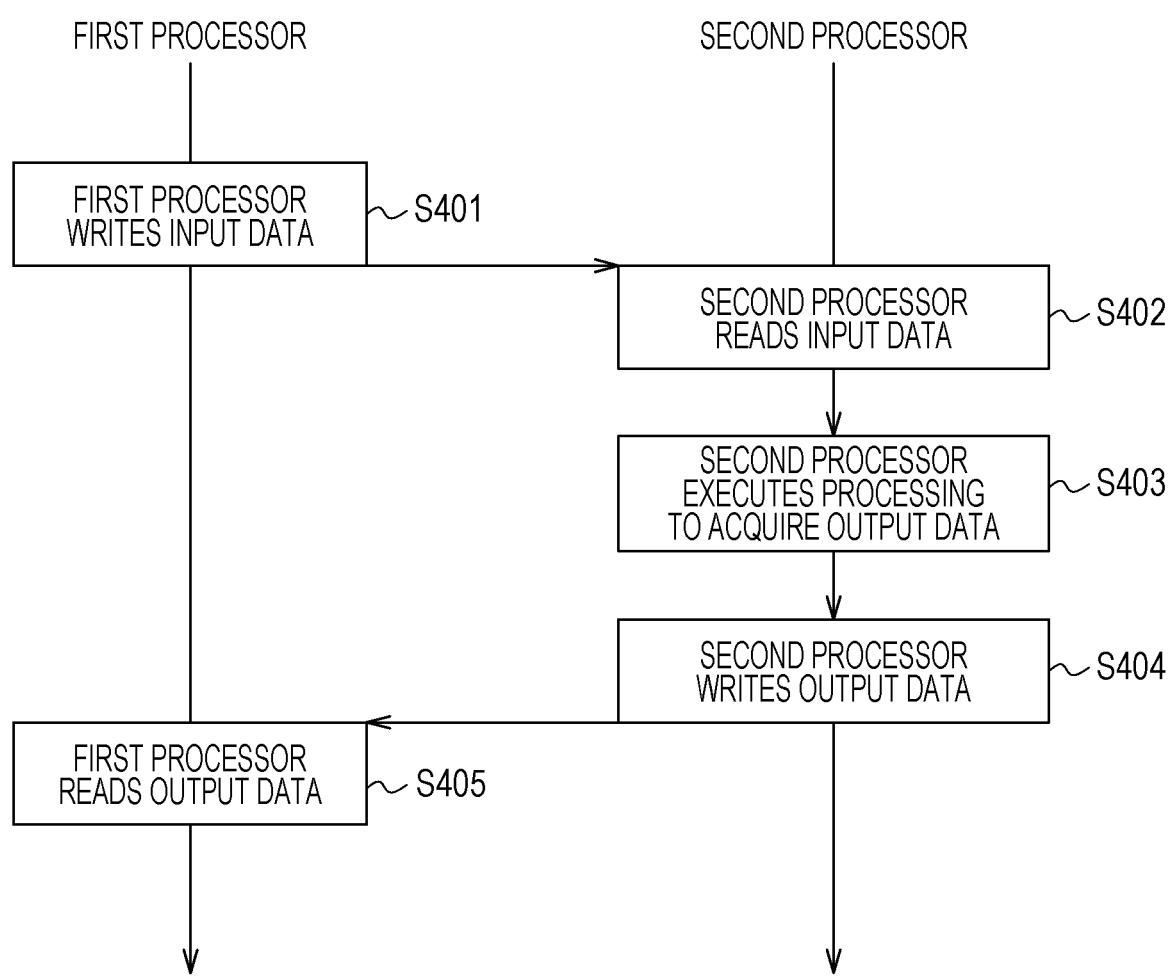

FIG. 5A

| | 301 | 302 | 303 | |
|---|---|---|---|---|
| 300 → | 1 | blk0 ADDRESS | blk0 SIZE | ←---- WP1 |
| | 1 | blk1 ADDRESS | blk1 SIZE | |
| | 1 | blk2 ADDRESS | blk2 SIZE | |
| | 1 | blk3 ADDRESS | blk3 SIZE | |
| | ⋮ | ⋮ | ⋮ | |
| | 1 | blkN ADDRESS | blkN SIZE | |

FIG. 5B

| | 301 | 302 | 303 | |
|---|---|---|---|---|
| 300 → | 0 | — | — | ←---- WP1 |
| | 1 | blk1 ADDRESS | blk1 SIZE | |
| | 1 | blk2 ADDRESS | blk2 SIZE | |
| | 1 | blk3 ADDRESS | blk3 SIZE | |
| | ⋮ | ⋮ | ⋮ | |
| | 1 | blkN ADDRESS | blkN SIZE | |

FIG. 6A

| | 301 | 302 | 303 |
|---|---|---|---|
| 300 → | 0 | — | — |
| | 0 | — | — |  ← RP1
| | 0 | — | — |
| | 0 | — | — |
| | ⋮ | ⋮ | ⋮ |
| | 0 | — | — |

FIG. 6B

| | 301 | 302 | 303 |
|---|---|---|---|
| 300 → | 0 | — | — |
| | 1 | blk1 ADDRESS | blk1 SIZE | ← RP1
| | 0 | — | — |
| | 0 | — | — |
| | ⋮ | ⋮ | ⋮ |
| | 0 | — | — |

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application No. 2017-135379, filed on Jul. 11, 2017, the entire contents of which are incorporated herein by reference.

FIELD

The embodiments discussed herein are related to an information processing apparatus and an information processing system.

BACKGROUND

A method of enforcing order of memory accesses is known. A memory access request is received from a device that is not configured to generate memory barrier commands. A surrogate barrier is generated in response to the memory access request. The memory access request may be a read request. In the case of a memory write request, the surrogate barrier is generated before the write request is processed. The surrogate barrier may be also generated in response to a memory read request on the condition of a preceding write request to the same address as the read request. Coherency is enforced within a hierarchical memory system as if a memory barrier command was received from the device that does not produce memory barrier commands.

According to the method, the surrogate barrier is generated in response to the memory read request on the condition of the preceding write request to the same address as the read request. When the preceding write request to the same address as the read request is present immediately prior to the read request, a search time for the preceding write request becomes small. However, a lot of write requests to other addresses may be present between the preceding write request and the read request. In this case, the search time for the preceding write request disadvantageously becomes large, lowering the power efficiency to slow down reading.

SUMMARY

According to an aspect of the present invention, provided is an information processing system including a memory and a first processor coupled to the memory. The memory includes a data area and a completion information area. The first processor is configured to issue a first write request group including a plurality of data write requests for writing first data to the data area. The first processor is configured to issue a first completion write request after issuing the first write request group. The first completion write request is a request for writing completion information to the completion information area. The completion information indicates completion of write processing requested by the first write request group. The first processor is configured to insert a first barrier instruction into the issued requests, between the first write request group and the first completion write request. The first processor is configured to control output of the first write request group, the first completion write request, and the first barrier instruction to the memory by outputting all of the plurality of data write requests included in the first write request group, subsequently outputting the first barrier instruction, and subsequently outputting the first completion write request. The plurality of data write requests are output through an out-of-order execution in which the plurality of data write requests are reordered.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a sequence diagram of exemplified processing of the information processing system;

FIGS. 5A and 5B are views examples of the first command FIFO at writing;

FIGS. 6A and 6B are views examples of the first command FIFO at reading;

DESCRIPTION OF EMBODIMENTS

First Embodiment

Figure 1:
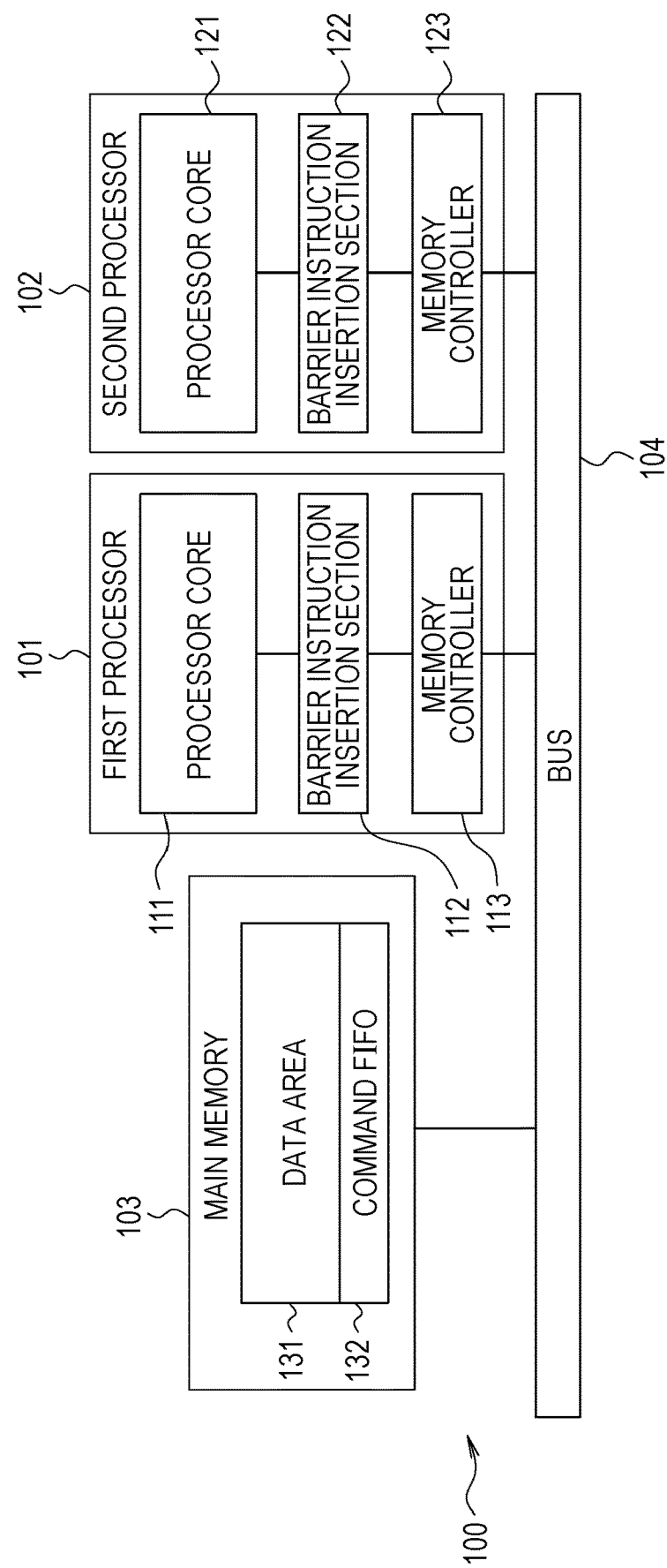
FIG. 1 is a view of an exemplified configuration of an information processing system in accordance with a first embodiment.

FIG. 1 is a view of an exemplified configuration of an information processing system 100 in accordance with a first embodiment. The information processing system 100 includes a first processor 101, a second processor 102, a main memory 103, and a bus 104. The first processor 101, the second processor 102, and the main memory 103 are connected to the bus 104. The first processor 101 is a first information processing apparatus that includes a processor core 111, a barrier instruction insertion section 112, and a memory controller 113. The second processor 102 is a second information processing apparatus that includes a processor core 121, a barrier instruction insertion section 122, and a memory controller 123. Data stored in the main memory 103 contains a data area 131 and a command first-in first-out (command FIFO) 132. The command FIFO 132 is a write completion information area.

The first processor 101 and the second processor 102 are connected to the same bus 104, and shares the main memory 103. For example, the first processor 101 is a central processing unit (CPU). The second processor 102 is a hardware accelerator that is a field-programmable gate array (FPGA) or a graphics processing unit (GPU). The first processor (CPU) 101 may entrust processing unsuited for software processing to the second processor (FPGA or GPU) 102. This may achieve speed-up of processing.

Figure 2:
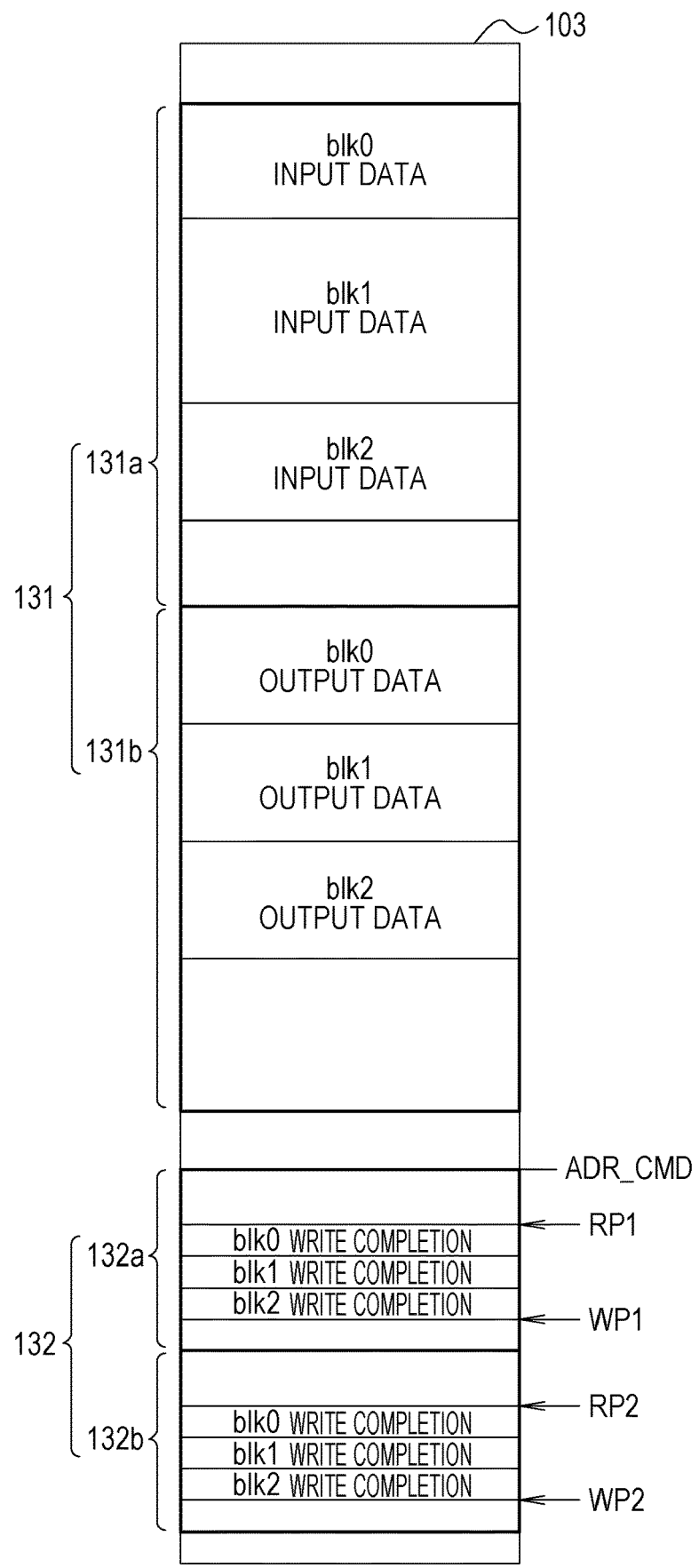
FIG. 2 is a view of an exemplified configuration of a main memory.

FIG. 2 is a view of an exemplified configuration of the main memory 103 illustrated in FIG. 1. Date stored in the main memory 103 contains the data area 131 and the command FIFO 132. The data area 131 has a first data area 131a and a second data area 131b. The first data area 131a stores input data in the unit of block, for example, input data in a block blk0, input data in a block blk1, and input data in a block blk2. In the case of communication, the block is a packet, a segment, or a frame. In the case of dynamic image encoding, the block is a group of picture (GOP), a picture, or a coding tree unit (CTU). The second data area 131b stores output data in the unit of block, for example, output data in a block blk0, output data in a block blk1, and output data in a block blk2.

A starting address of the command FIFO 132 is an address ADR_CMD. The command FIFO 132 is provided in an address area following the address ADR_CMD, and includes a first command FIFO 132a and a second command FIFO 132b. The first command FIFO 132a corresponds to the first data area 131a, and stores write completion information on input data in each block. The first command FIFO 132a stores, for example, write completion information on input data in the block blk0, write completion information on input data in the block blk1, and write completion information on input data in the block blk2. In the first command FIFO 132a, writing to an address corresponding to a write pointer WP1 is performed, and reading from an address corresponding to a read pointer RP1 is performed.

The second command FIFO 132b corresponds to the second data area 131b, and stores write completion information on output data in each block. The second command FIFO 132b stores, for example, write completion information on output data in the block blk0, write completion information on output data in the block blk1, and write completion information on output data in the block blk2. In the second command FIFO 132b, writing to an address corresponding to a write pointer WP2 is performed, and reading from an address corresponding to a read pointer RP2 is performed.

Figures 3A, 3B:
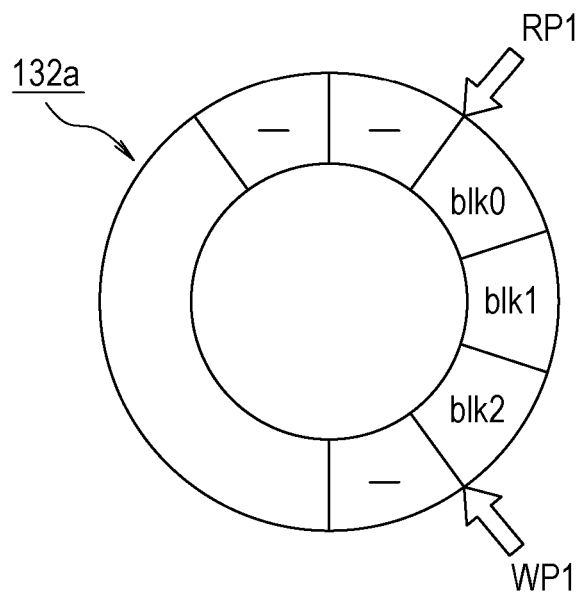
FIG. 3A is a view of exemplified logical configuration of a first command FIFO.
FIG. 3B is a view of exemplified physical configuration of the first command FIFO.

FIG. 3A is a view of an exemplified logical configuration of the first command FIFO 132a, and FIG. 3B is a view of an exemplified physical configuration of the first command FIFO 132a. An example of the first command FIFO 132a will be hereinafter described. However, the second command FIFO 132b has the same configuration as the first command FIFO 132a. The first command FIFO 132a stores write completion information 300 in each block in a first-in first-out manner. The write completion information 300 is one word-sized information, and includes a valid flag 301, a block start address 302, and a block size 303.

The valid flag 301 is "1" when the write completion information 300 is valid, and is "0" when the write completion information 300 is invalid. The block start address 302 is a start address of the block written in the first data area 131a. The block size 303 is data size of the block written in the first data area 131a.

In the first command FIFO 132a, in response to the write request, new write completion information 300 is written to the address corresponding to the write pointer WP1 to increment the write pointer WP1. In the first command FIFO 132a, in response to the read request, write completion information 300 stored in the address corresponding to the read pointer RP1 to increment the read pointer RP1.

FIG. 4 is a sequence diagram of exemplified processing executed by the information processing system 100. In S401, the first processor 101 writes input data in each block into the first data area 131a of the main memory 103. The input data is data to be processed by the second processor 102. When writing one block in input data is completed, the first processor 101 writes the write completion information 300 in each block to the address corresponding to the write pointer WP1 in the first command FIFO 132a of the main memory 103. The write completion information 300 includes the valid flag 301 of "1".

Next, in S402, the second processor 102 reads the write completion information 300 stored at the address corresponding to the read pointer RP1 in the first command FIFO 132a of the main memory 103. When the valid flag 301 in the write completion information 300 is "0", which represents that writing input data is not completed, the second processor 102 repeats the processing of reading the write completion information 300 stored at the address corresponding to the read pointer RP1. When the valid flag 301 in the write completion information 300 is "1", which represents that writing input data is completed, the second processor 102 reads input data in each block from the first data area 131a of the main memory 103, based on the block start address 302 and the block size 303 in the write completion information 300.

Next, in S403, the second processor 102 applies processing such as communication or image processing to the read input data in each block to acquire output data in each block.

Next, in S404, the second processor 102 writes the output data in each block into the second data area 131b of the main memory 103. When writing one block in the output data is completed, the second processor 102 writes the write completion information 300 in each block to the address corresponding to the write pointer WP2 in the second command FIFO 132b of the main memory 103. The write completion information 300 includes the valid flag 301 of "1".

Next, in S405, the first processor 101 reads the write completion information 300 stored at the address corresponding to the read pointer RP2 in the second command FIFO 132b of the main memory 103. When the valid flag 301 in the write completion information 300 is "0", which represents that writing output data is not completed, the first processor 101 repeats the processing of reading the write completion information 300 stored at the address corresponding to the read pointer RP2. When the valid flag 301 in the write completion information 300 is "1", which represents that writing output data is completed, the first processor 101 reads output data in each block from the second data area 131b of the main memory 103, based on the block start address 302 and the block size 303 in the write completion information 300.

The write processing executed by the second processor 102 in S404 is the same as the write processing executed by the first processor 101 in S401. The read processing executed by the first processor 101 in S405 is the same as the read processing executed by the second processor 102 in S402.

FIG. 5A is a view of the first command FIFO 132a in which all of the valid flags 301 are "1". When all of the valid flags 301 are "1", the first command FIFO 132a is full. In S401, first, the first processor 101 reads the write completion information 300 at the address corresponding to the write pointer WP1. When the valid flag 301 in the write completion information 300 is "1", the first command FIFO 132a is full. In this case, the first processor 101 repeats the processing of reading the write completion information 300 at the address corresponding to the write pointer WP1 until the valid flag 301 becomes "0". In this case, the first processor 101 may not write input data.

As illustrated in FIG. 5B, when the write completion information 300 at the address corresponding to the write pointer WP1 becomes unnecessary, the valid flag 301 in the write completion information 300 becomes "0". The first processor 101 reads the write completion information 300 corresponding to the write pointer WP1. When the valid flag 301 in the write completion information 300 is "0", the first processor 101 writes input data in each block into the first data area 131a. Then, the first processor 101 writes the write completion information 300 including the valid flag 301 of "1" at the address corresponding to the write pointer WP1 in the first command FIFO 132a to increment the write pointer WP1.

FIG. 6A is a view of the first command FIFO 132a in which all of the valid flags 301 are "0". All of the valid flags 301 are "0", which represents that the first command FIFO 132a is empty, and no input data is written in the first data area 131a. In S402, firstly, the second processor 102 reads write completion information 300 at the address corresponding to the read pointer RP1. The valid flag 301 in the write completion information 300 is "0", which represents that no input data is written in the first data area 131a. In this case, the second processor 102 repeats the processing of reading the write completion information 300 at the address corresponding to the read pointer RP1 until the valid flag 301 becomes "1". In this case, since writing the input data is not completed, the second processor 102 may not read the input data.

As illustrated in FIG. 6B, when writing the input data is completed, the valid flag 301 in the write completion information 300 at the address corresponding to the read pointer RP1 becomes "1". The second processor 102 reads the write completion information 300 at the address corresponding to the read pointer RP1. When the valid flag 301 in the write completion information 300 is "1", the second processor 102 reads input data in each block from the first data area 131a. Then, the second processor 102 writes the write completion information 300 including the valid flag 301 of "0" at the address corresponding to the read pointer RP1 in the first command FIFO 132a to increment the read pointer RP1.

Figure 7:
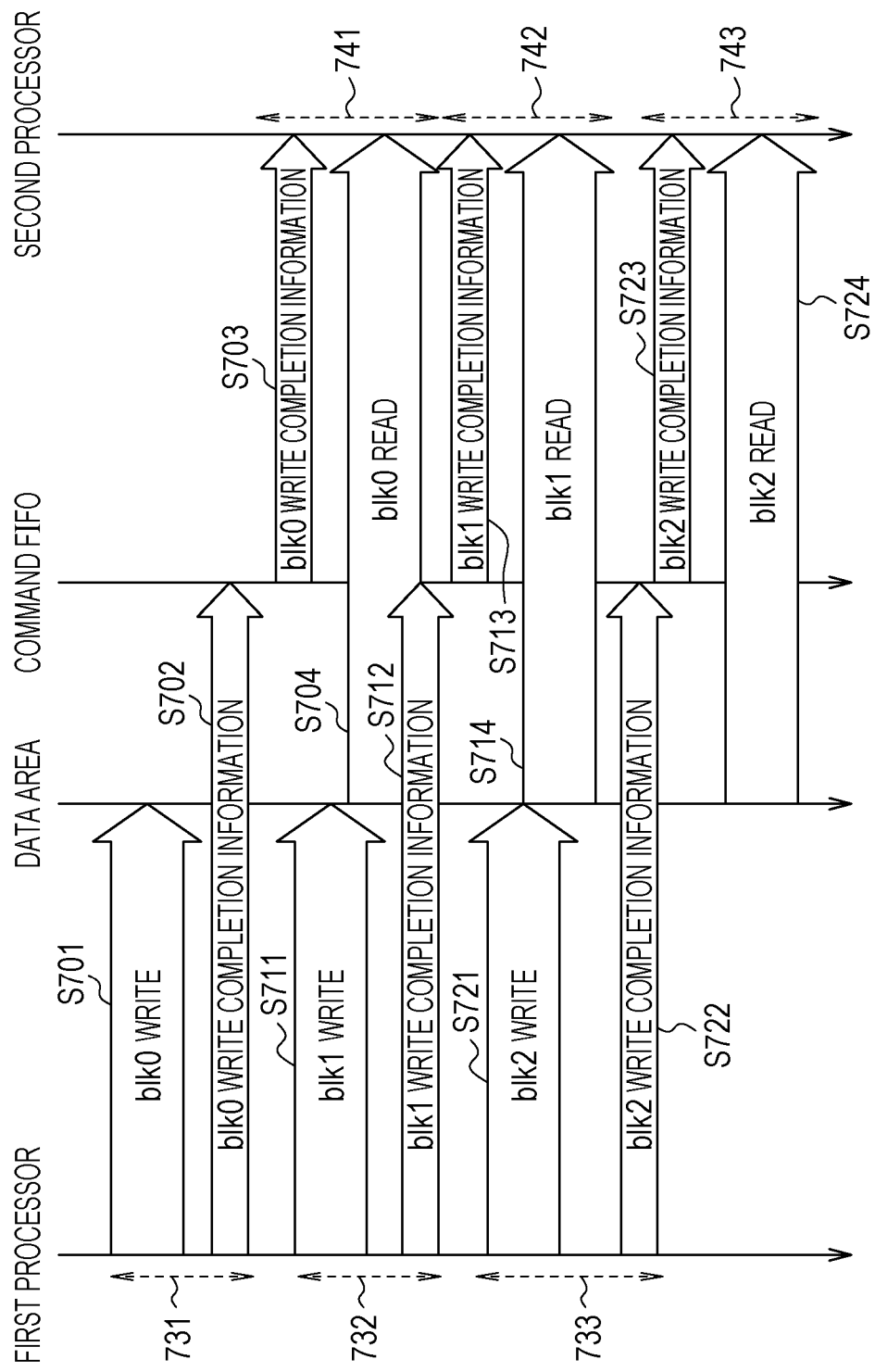
FIG. 7 is a sequence diagram illustrating details of write processing and read processing.

FIG. 7 is a sequence diagram of details of the write processing in S401 and the read processing in S402 in FIG. 4. The first processor 101 has an access right 731 to the block blk0, and executes processing in S701 and S702. In S701, the first processor 101 writes input data in the block blk0 into the first data area 131a. Next, in S702, the first processor 101 writes write completion information 300 on the input data in the block blk0 into the first command FIFO 132a.

The second processor 102 has an access right 741 to the block blk0, and executes processing in S703 and S704. In S703, the second processor 102 reads the write completion information 300 on the input data in the block blk0 from the first command FIFO 132a. Next, in S704, when the valid flag 301 in the write completion information 300 on the input data in the block blk0 is "1", the second processor 102 reads the input data in the block blk0 from the first data area 131a, based on the block start address 302 and the block size 303 in the write completion information 300.

The first processor 101 has an access right 732 to the block blk1, and executes processing in S711 and S712. In S711, the first processor 101 writes the input data in the block blk1 into the first data area 131a. Next, in S712, the first processor 101 writes the write completion information 300 on the input data in the block blk1 into the first command FIFO 132a.

The second processor 102 has an access right 742 to the block blk1, and executes processing in S713 and S714. In S713, the second processor 102 reads write completion information 300 on the input data in the block blk1 from the first command FIFO 132a. Next, in S714, when the valid flag 301 in the write completion information 300 on the input data in the block blk1 is "1", the second processor 102 reads the input data in the block blk1 from the first data area 131a, based on the block start address 302 and the block size 303 in the write completion information 300.

The first processor 101 has an access right 733 to the block blk2, and executes processing in S721 and S722. In S721, the first processor 101 writes input data in the block blk2 into the first data area 131a. Next, in S722, the first processor 101 writes write completion information 300 on input data in the block blk2 into the first command FIFO 132a.

The second processor 102 has an access right 743 to the block blk2, and executes processing in S723 and S724. In S723, the second processor 102 reads the write completion information 300 on the input data in the block blk2 from the first command FIFO 132a. Next, in S724, when the valid flag 301 in the write completion information 300 on the input data in the block blk2 is "1", the second processor 102 reads the input data in the block blk2 from the first data area 131a, based on the block start address 302 and the block size 303 in the write completion information 300.

In this manner, through writing the write completion information 300 by the first processor 101 and reading the write completion information 300 by the second processor 102, the access right is moved from the first processor 101 to the second processor 102 for each block. As illustrated in FIG. 2, input data in each block is stored at the corresponding address in the first data area 131a. This enables the pipeline operation that the first processor 101 writes input data in the block blk1 and subsequent blocks while the second processor 102 is reading the input data in the block blk0.

Figure 8A:
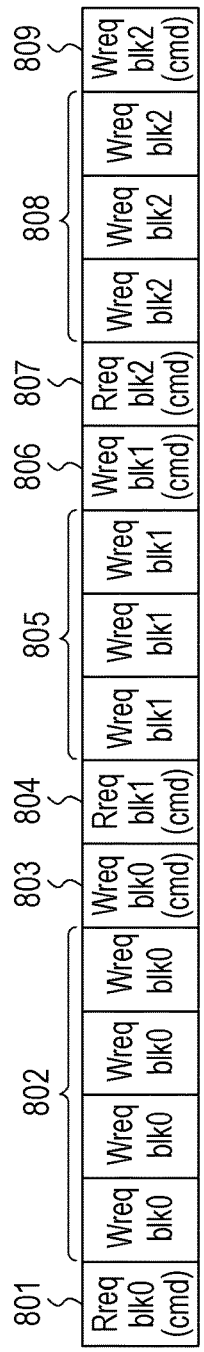
FIG. 8A is a view illustrating the order of requests issued by a processor core of a first processor.
Figure 8B:
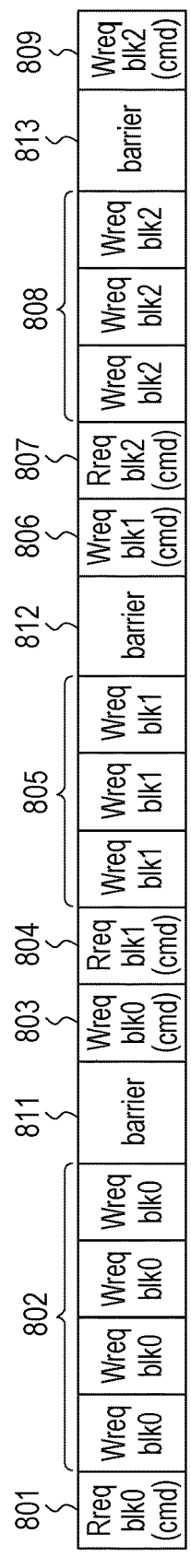
FIG. 8B is a view illustrating the order of requests and barrier instructions output from a barrier instruction insertion section of the first processor.
Figure 8C:
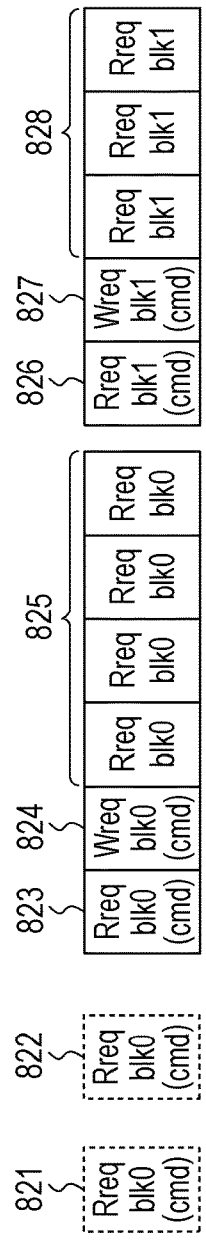
FIG. 8C is a view illustrating the order of requests issued by a processor core of a second processor.

FIG. 8A illustrates the order of requests issued by the processor core 111 of the first processor 101. FIG. 8B illustrates the order of requests and barrier instructions that are outputted by the barrier instruction insertion section 112 of the first processor 101. FIG. 8C illustrates the order of requests issued by the processor core 121 of the second processor 102. As described later, the memory controller 113 outputs requests issued by the processor core 111 through an out-of-order execution. That is, the memory controller 113 does not output the requests in the order that the processor core 111 issues the requests, but optimally reorders the requests according to data dependency and so on, and then outputs the requests. However, as illustrated in FIG. 8C, the barrier instruction causes the memory controller 113 to decline the reordering of the requests over the barrier instruction.

Figure 9:
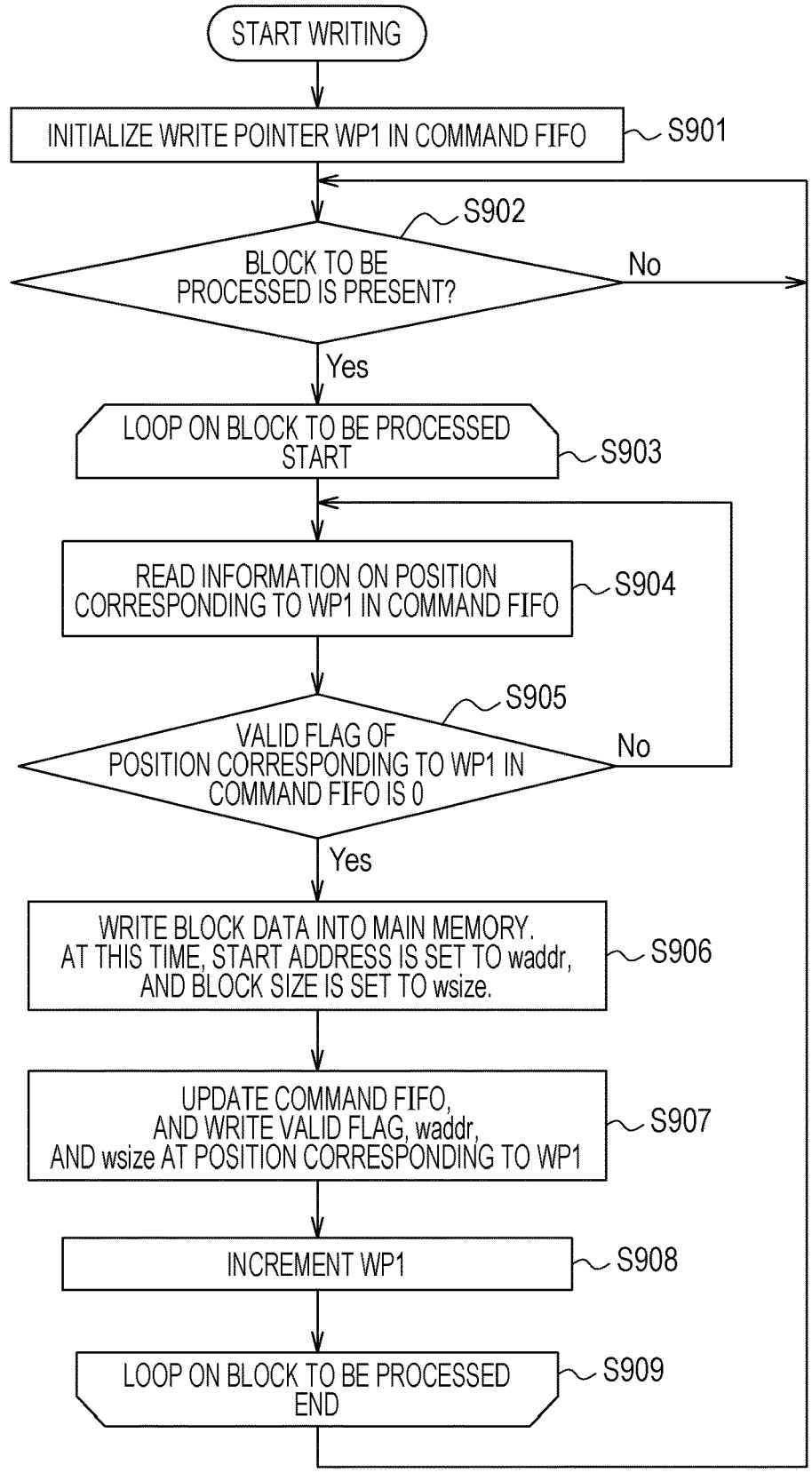
FIG. 9 is a flow chart illustrating details of write processing executed by the processor core.

FIG. 9 is a flow chart illustrating details of the write processing executed by the processor core 111 of the first processor 101 in S401 in FIG. 4. In S901, the processor core 111 stores the write pointer WP1 in the first command FIFO 132a, and initializes the write pointer WP1 in the first command FIFO 132a to 0. Next, in S902, the processor core 111 waits until input data in a block to be processed appears, and when the input data in the block is present, proceeds to processing in S903. S903 to S909 are loop processing with respect to the block to be processed.

First, in S903, the processor core 111 sets the initial block blk0 to the block to be processed. Next, in S904, the processor core 111 issues a read request 801 (FIG. 8A) of the write completion information 300 on the input data in the block blk0 stored at the address in the first command FIFO 132a corresponding to the write pointer WP1 in the first command FIFO 132a.

The first processor 101 outputs the read request 801 to the main memory 103 via the bus 104. In response to the read request 801, the main memory 103 reads the write completion information 300 on the input data in the block blk0 stored at the address in the first command FIFO 132a. Then, the main memory 103 outputs the write completion information 300 to the first processor 101 via the bus 104. The processor core 111 receives the write completion information 300.

Next, in S905, the processor core 111 reads the valid flag 301 in the write completion information 300. If the valid flag 301 is "1", which represents that the first command FIFO 132a is full, the processor core 111 returns processing to S904. If the valid flag 301 is "0", which represents that the first command FIFO 132a is not full, the processor core 111 proceeds to processing in S906.

In S906, the processor core 111 issues a write request group 802 (FIG. 8A) of input data in the block blk0. Here, the first processor 101 performs writing into the main memory 103 in the unit of data length of a cache line. As illustrated in FIG. 8A, the write request group 802 of the input data in the block blk0 includes a plurality of data write requests having the data length of the cache line at consecutive addresses. In response to the write request group 802 of the input data in the block blk0, the processor core 111 sets a write start address of the input data in the block blk0 to a variable waddr, and sets the size of the input data in the block blk0 to a variable wsize.

Next, in S907, the processor core 111 issues a write request 803 (FIG. 8A) for writing the write completion information 300 on the input data in the block blk0 to the address in the first command FIFO 132a, which corresponds to the write pointer WP1 in the first command FIFO 132a. The write request 803 is a write completion write request for writing the write completion information 300 on the write request group 802. The write completion information 300 includes the valid flag 301 of "1", the write start address waddr of the input data in the block blk0 (write request group 802), and the write data size wsize of the input data in the block blk0 (write request group 802). The valid flag 301 is information indicating completion of writing the write request group 802.

Next, in S908, the processor core 111 increments the write pointer WP1 in the first command FIFO 132a. Next, in S909, the processor core 111 sets the next block blk1 to a block to be processed, and returns processing to S903.

Next, in S904, the processor core 111 issues a read request 804 (FIG. 8A) of the write completion information 300 on the input data in the block blk1 stored at the address in the first command FIFO 132a, which corresponds to the write pointer WP1 in the first command FIFO 132a.

The first processor 101 outputs the read request 804 to the main memory 103 via the bus 104. In response to the read request 804, the main memory 103 reads the write completion information 300 on the input data in the block blk1 stored at the address in the first command FIFO 132a. Then, the main memory 103 outputs the write completion information 300 to the first processor 101 via the bus 104. The processor core 111 receives the write completion information 300.

Next, in S905, the processor core 111 checks if the valid flag 301 in the write completion information 300 is "0", which represents that the first command FIFO 132a is not full. If the write completion information 300 is "0", the processor core 111 proceeds processing to S906.

In S906, the processor core 111 issues a write request group 805 (FIG. 8A) of the input data in the block blk1. As illustrated in FIG. 8A, the write request group 805 of the input data in the block blk1 includes a plurality of data write requests having the data length of the cache line at consecutive addresses. In response to the write request group 805 of the input data in the block blk1, the processor core 111 sets a write start address of the input data in the block blk1 to the variable waddr, and sets the size of the input data in the block blk1 to the variable wsize.

Next, in S907, the processor core 111 issues a write request 806 (FIG. 8A) for writing the write completion information 300 on the input data in the block blk1 at the address in the first command FIFO 132a, which corresponds to the write pointer WP1 in the first command FIFO 132a. The write request 806 is a write completion write request for writing the write completion information 300 of the write request group 805. The write completion information 300 includes the valid flag 301 of "1", the write start address waddr of the input data in the block blk1 (write request group 805), and the write data size wsize of the input data in the block blk1 (write request group 805). The valid flag 301 is information indicating completion of writing the write request group 805.

Next, in S908, the processor core 111 increments the write pointer WP1 in the first command FIFO 132a. In S909, the processor core 111 sets the next block blk2 to a block to be processed, and executes the next loop starting from S903.

Next, in S904, the processor core 111 issues a read request 807 (FIG. 8A) of the write completion information 300 on the input data in the block blk2 stored at the address in the first command FIFO 132a, which corresponds to the write pointer WP1 in the first command FIFO 132a.

The first processor 101 outputs the read request 807 to the main memory 103 via the bus 104. In response to the read request 807, the main memory 103 reads the write completion information 300 on the input data in the block blk2 stored at the address in the first command FIFO 132a. Then, the main memory 103 outputs the write completion information 300 to the first processor 101 via the bus 104. The processor core 111 receives the write completion information 300.

Next, in S905, the processor core 111 checks if the valid flag 301 in the write completion information 300 is "0", which represents that the first command FIFO 132a is not full. If the write completion information 300 is "0", the processor core 111 proceeds processing to S906.

In S906, the processor core 111 issues a write request group 808 (FIG. 8A) of the input data in the block blk2. As illustrated in FIG. 8A, the write request group 808 of the input data in the block blk2 includes a plurality of data write requests having the data length of the cache line at consecutive addresses. In response to the write request group 808 of the input data in the block blk2, the processor core 111 sets the write start address of the input data in the block blk2 to the variable waddr, and sets the size of the input data in the block blk2 to the variable wsize.

Next, in S907, the processor core 111 issues a write request 809 (FIG. 8A) for writing the write completion information 300 on the input data in the block blk2 at the address in the first command FIFO 132a, which corresponds to the write pointer WP1 in the first command FIFO 132a. The write request 809 is a write completion write request for writing the write completion information 300 on the write request group 808. The write completion information 300 includes the valid flag 301 of "1", the write start address waddr of the input data in the block blk2 (write request group 808), and the write data size wsize of the input data in the block blk2 (write request group 808). The valid flag 301 is information indicating completion of writing the write request group 808. Hereinafter, similarly, the processor core 111 repeats processing for the block blk3 and subsequent blocks.

The case of omitting the barrier instruction insertion section 112 from FIG. 1 will be described below. In this case, the memory controller 113 outputs requests issued by the processor core 111 through an out-of-order execution. That is, the memory controller 113 does not output the requests in the order that the processor core 111 issues the requests, but optimally reorders the requests according to data dependence and so on and then, outputs the requests. As a result, the memory controller 113 may output the write request 803 of the write completion information 300 before outputting all of the write requests in the write request group 802 in the block blk0. When confirming that the write completion information 300 is written, the second processor 102 starts the read processing. However, at this time, writing the input data in the block blk0 may not be completed. In this case, the second processor 102 reads wrong input data in the block blk0 before writing. In this embodiment, to solve this problem, the barrier instruction insertion sections 112 and 122 are provided.

Figure 10A:
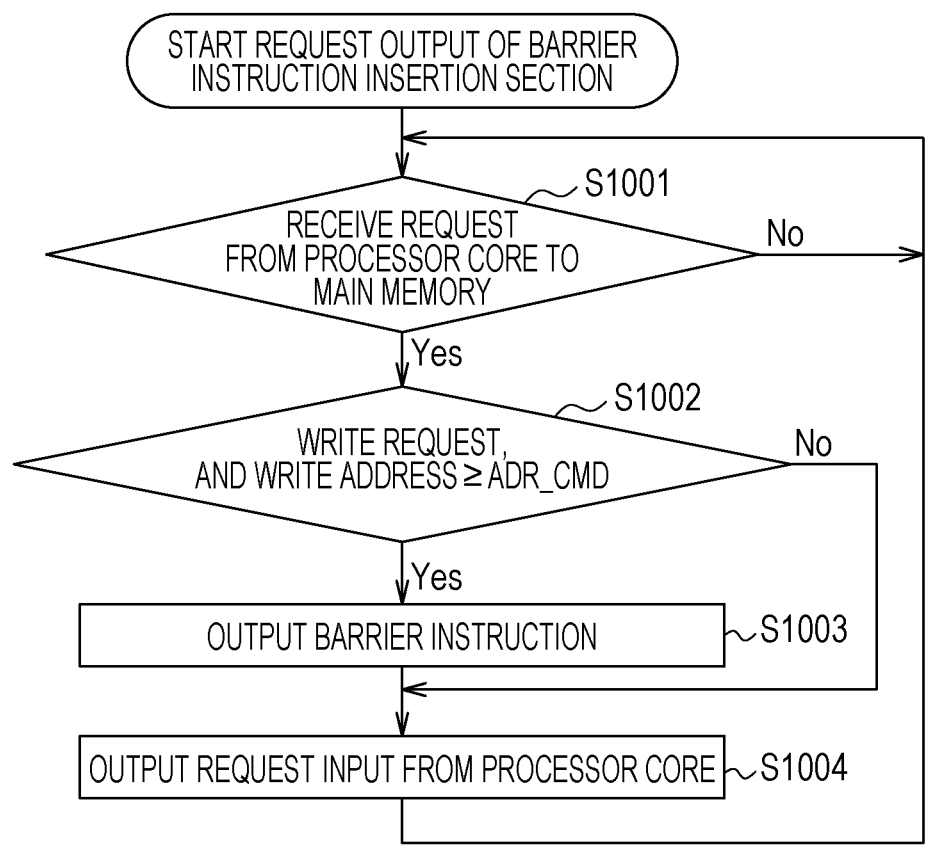
FIG. 10A is a flow chart illustrating details of request output processing executed by the barrier instruction insertion section.

FIG. 10A is a flow chart illustrating details of request output processing executed by the barrier instruction insertion section 112 of the first processor 101 in S401 in FIG. 4. In S1001, the barrier instruction insertion section 112 waits until receipt of a request from the processor core 111 to the main memory 103, and proceeds processing to S1002 at receipt of the request.

In S1002, the barrier instruction insertion section 112 checks whether or not the input request is the write request, and a write address of the write request is an address that is equal or greater than the address ADR_CMD. As illustrated in FIG. 2, the address ADR_CMD is the starting address in the command FIFO 132. The write request to the address that is equal or greater than the address ADR_CMD is the write request to the command FIFO 132. The write request to the address that is smaller than the address ADR_CMD is the write request to the data area 131. Since the input read request 801 (FIG. 8A) is not the write request, the barrier instruction insertion section 112 proceeds processing to S1004. In S1004, as illustrated in FIG. 8B, the barrier instruction insertion section 112 outputs the read request 801 input from the processor core 111 to the memory controller 113, and returns processing to S1001.

Next, in S1002, since the write address of the write request in the input write request group 802 (FIG. 8A) is smaller than the address ADR_CMD, the barrier instruction insertion section 112 proceeds processing to S1004. The write request in the write request group 802 is the write request to the address in the first data area 131a. In S1004, as illustrated in FIG. 8B, the barrier instruction insertion section 112 outputs the write request in the write request group 802, which is input from the processor core 111, to the memory controller 113, and returns processing to S1001.

Next, in S1002, since the input write request 803 (FIG. 8A) is the write request, and the write address of the write request 803 is equal or greater than the address ADR_CMD, the barrier instruction insertion section 112 proceeds processing to S1003. The write request 803 is the write request to the address in the first command FIFO 132a. In S1003, as illustrated in FIG. 8B, the barrier instruction insertion section 112 outputs a barrier instruction 811 to the memory controller 113. Next, in S1004, as illustrated in FIG. 8B, the barrier instruction insertion section 112 outputs the write request 803 input from the processor core 111 to the memory controller 113, and returns processing to S1001. As described above, the barrier instruction insertion section 112 inserts the barrier instruction 811 immediately prior to the write request 803 of the write completion information 300.

Next, in S1002, since the input read request 804 (FIG. 8A) is not the write request, the barrier instruction insertion section 112 proceeds processing to S1004. In S1004, as illustrated in FIG. 8B, the barrier instruction insertion section 112 outputs the read request 804 input from the processor core 111 to the memory controller 113, and returns processing to S1001.

Next, in S1002, since the write address of the write request in the input write request group 805 (FIG. 8A) is smaller than the address ADR_CMD, the barrier instruction insertion section 112 proceeds processing to S1004. In S1004, as illustrated in FIG. 8B, barrier instruction insertion section 112 outputs the write request in the write request group 805 input from the processor core 111 to the memory controller 113, and returns processing to S1001.

Next, in S1002, since the input write request 806 (FIG. 8A) is the write request, and the write address of the write request 806 is equal or greater than the address ADR_CMD, the barrier instruction insertion section 112 proceeds processing to S1003. In S1003, as illustrated in FIG. 8B, the barrier instruction insertion section 112 outputs a barrier instruction 812 to the memory controller 113. Next, in S1004, as illustrated in FIG. 8B, the barrier instruction insertion section 112 outputs the write request 806 input from the processor core 111 to the memory controller 113, and returns processing to S1001. As described above, the barrier instruction insertion section 112 inserts the barrier instruction 812 immediately prior to the write request 806 of the write completion information 300.

Next, in S1002, since the input read request 807 (FIG. 8A) is not the write request, the barrier instruction insertion section 112 proceeds processing to S1004. In S1004, as illustrated in FIG. 8B, the barrier instruction insertion section 112 outputs the read request 807 input from the processor core 111 to the memory controller 113, and returns processing to S1001.

Next, in S1002, since the write address of the write request in the input write request group 808 (FIG. 8A) is smaller than the address ADR_CMD, the barrier instruction insertion section 112 proceeds processing to S1004. In S1004, as illustrated in FIG. 8B, the barrier instruction insertion section 112 outputs the write request in the write request group 808 input from the processor core 111 to the memory controller 113, and returns processing to S1001.

Next, in S1002, since the input write request 809 (FIG. 8A) is the write request, and the write address of the write request 809 is equal or greater than the address ADR_CMD, the barrier instruction insertion section 112 proceeds processing to S1003. In S1003, as illustrated in FIG. 8B, the barrier instruction insertion section 112 outputs a barrier instruction 813 to the memory controller 113. Next, in S1004, as illustrated in FIG. 8B, the barrier instruction insertion section 112 outputs the write request 809 input from the processor core 111 to the memory controller 113, and returns processing to S1001. As described above, the barrier instruction insertion section 112 inserts the barrier instruction 813 immediately prior to the write request 809 of the write completion information 300.

Figure 10B:
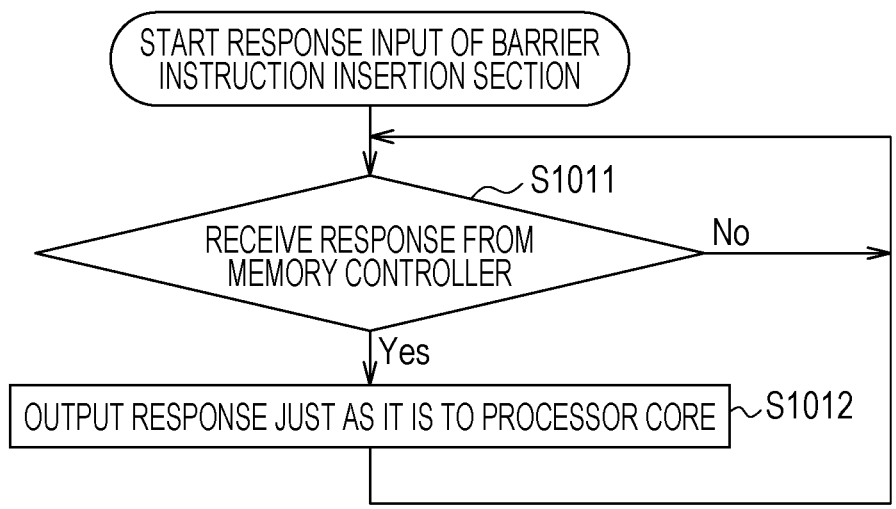
FIG. 10B is a flow chart illustrating details of response input processing executed by the barrier instruction insertion section.

FIG. 10B is a flow chart illustrating details of response input processing executed by the barrier instruction insertion section 112 of the first processor 101 in S401 in FIG. 4. In S1011, the barrier instruction insertion section 112 waits until receipt of a response from the memory controller 113, and proceeds processing to S1012 at receipt of the response. For example, the response is the write completion information 300 read in response to the read requests 801, 804, and 807. In S1012, the barrier instruction insertion section 112 outputs the response input from the memory controller 113 just as it is to the processor core 111, and returns processing to S1011.

Figure 11A:
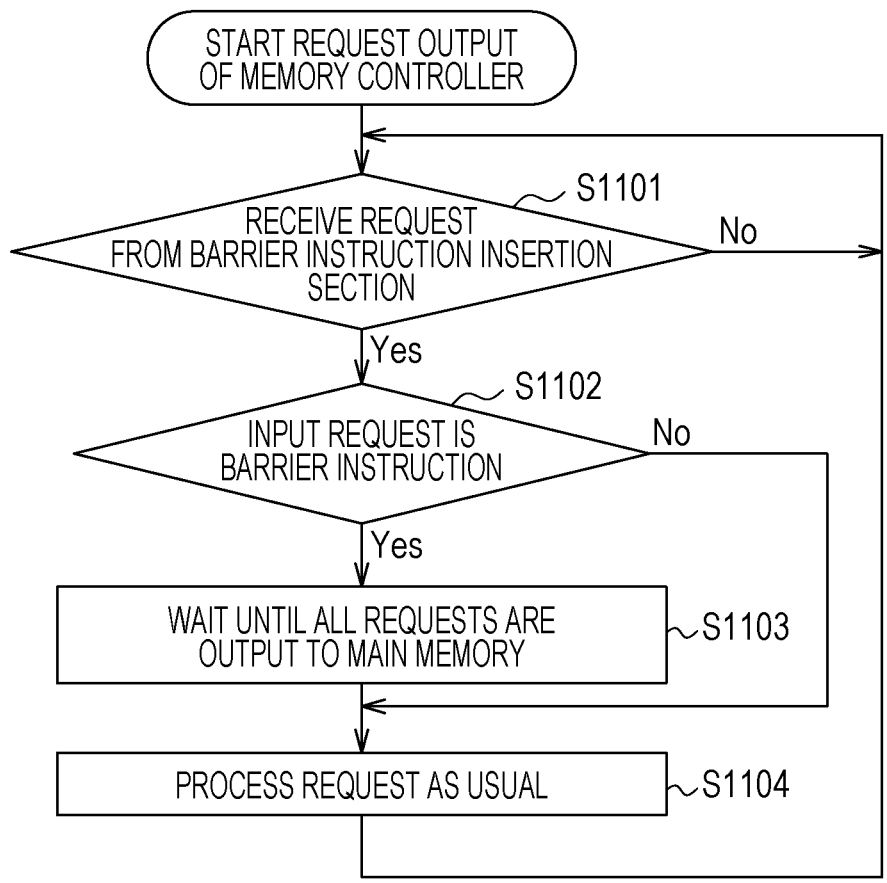
FIG. 11A is a flow chart illustrating details of request output processing executed by a memory controller.

FIG. 11A is a flow chart illustrating details of request output processing executed by the memory controller 113 of the first processor 101 in S401 in FIG. 4. In S1101, the memory controller 113 waits receipt of a request from the barrier instruction insertion section 112, and proceeds processing to S1102 at receipt of the request. In S1102, the memory controller 113 checks whether or not the input request is the barrier instruction, proceeds processing to S1103 when the input request is the barrier instruction, and proceeds processing to S1104 when the input request is not the barrier instruction. In S1103, the memory controller 113 waits until all of requests are output to the main memory 103 via the bus 104, and when all of requests preceding the barrier instruction are output, proceeds processing to S1104. In S1104, the memory controller 113 outputs the requests preceding the barrier instruction via the bus 104 through an out-of-order execution, and returns processing to S1101. That is, the memory controller 113 optimally reorders the requests preceding the barrier instruction input from the barrier instruction insertion section 112, and outputs the requests.

For example, as illustrated in FIG. 8B, the memory controller 113 first outputs the read request 801. In response to the read request 801, the main memory 103 reads the write completion information 300 on the input data in the block blk0. When the valid flag 301 in the write completion information 300 is "0", the processor core 111 issues the write request group 802. The memory controller 113 outputs a plurality of write requests included in the write request group 802 preceding the barrier instruction 811 via the bus 104 to the main memory 103 through an out-of-order execution. Then, after outputting the plurality of write requests included in the write request group 802 preceding the barrier instruction 811 through an out-of-order execution, the memory controller 113 outputs the write request 803 and the read request 804 that follow the barrier instruction 811. Thus, the main memory 103 writes the input data in the block blk0 corresponding to the write request group 802 into the first data area 131a and then, writes the write completion information 300 on the input data in the block blk0 corresponding to the write request 803 into the first command FIFO 132a. When the valid flag 301 in the write completion information 300 on the input data in the block blk0, which is read from the first command FIFO 132a, is "1", writing the input data in the block blk0 into the first data area 131a is completed. Thus, the second processor 102 may read correct input data in the block blk0.

Next, in response to the read request 804, the main memory 103 reads the write completion information 300 on the input data in the block blk1. When the valid flag 301 in the write completion information 300 is "0", the processor core 111 issues the write request group 805. The memory controller 113 outputs a plurality of write requests included in the write request group 805 preceding the barrier instruction 812 through an out-of-order execution to the main memory 103 via the bus 104. Then, after outputting all of the plurality of write requests included in the write request group 805 preceding the barrier instruction 812 through an out-of-order execution, the memory controller 113 outputs the write request 806 and the read request 807 that follows the barrier instruction 812. Thus, the main memory 103 writes the input data in the block blk1 corresponding to the write request group 805 into the first data area 131a and then, writes the write completion information 300 on the input data in the block blk1 corresponding to the write request 806 into the first command FIFO 132a. When the valid flag 301 in the write completion information 300 on the input data in the block blk1, which is read from the first command FIFO 132a, is "1", writing the input data in the block blk1 into the first data area 131a is completed. Thus, the second processor 102 may correct input data in the block blk1.

Next, in response to the read request 807, the main memory 103 reads the write completion information 300 on the input data in the block blk2. When the valid flag 301 in the write completion information 300 is "0", the processor core 111 issues the write request group 808. The memory controller 113 outputs a plurality of write requests included in the write request group 808 preceding the barrier instruction 813 through an out-of-order execution to the main memory 103 via the bus 104. Then, after outputting all of the plurality of write requests included in the write request group 808 preceding the barrier instruction 813 through an out-of-order execution, the memory controller 113 outputs the write request 809 following the barrier instruction 813. Thus, the main memory 103 writes the input data in the block blk2 corresponding to the write request group 808 into the first data area 131a and then, writes the write completion information 300 on the input data in the block blk2 corresponding to the write request 809 into the first command FIFO 132a. When the valid flag 301 in the write completion information 300 on the input data in the block blk2, which is read from the first command FIFO 132a, is "1", writing the input data in the block blk2 into the first data area 131a is completed. Thus, the second processor 102 may read correct input data in the block blk2.

Figure 11B:
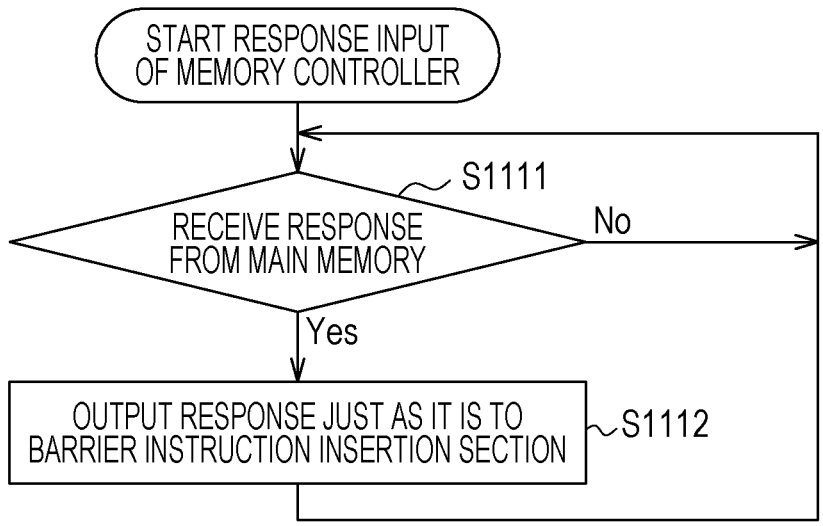
FIG. 11B is a flow chart illustrating details of response input processing executed by the memory controller.

FIG. 11B is a flow chart illustrating details of response input processing executed by the memory controller 113 of the first processor 101 in S401 in FIG. 4. In S1111, the memory controller 113 waits until receipt of a response from the main memory 103 via the bus 104, and proceeds processing to S1112 at receipt of the response. For example, the response is the write completion information 300 read in response to the read requests 801, 804, and 807. In S1112, the memory controller 113 outputs the response input from the main memory 103 just as it is via the bus 104 to the barrier instruction insertion section 112, and returns processing to S1111.

Figure 12:
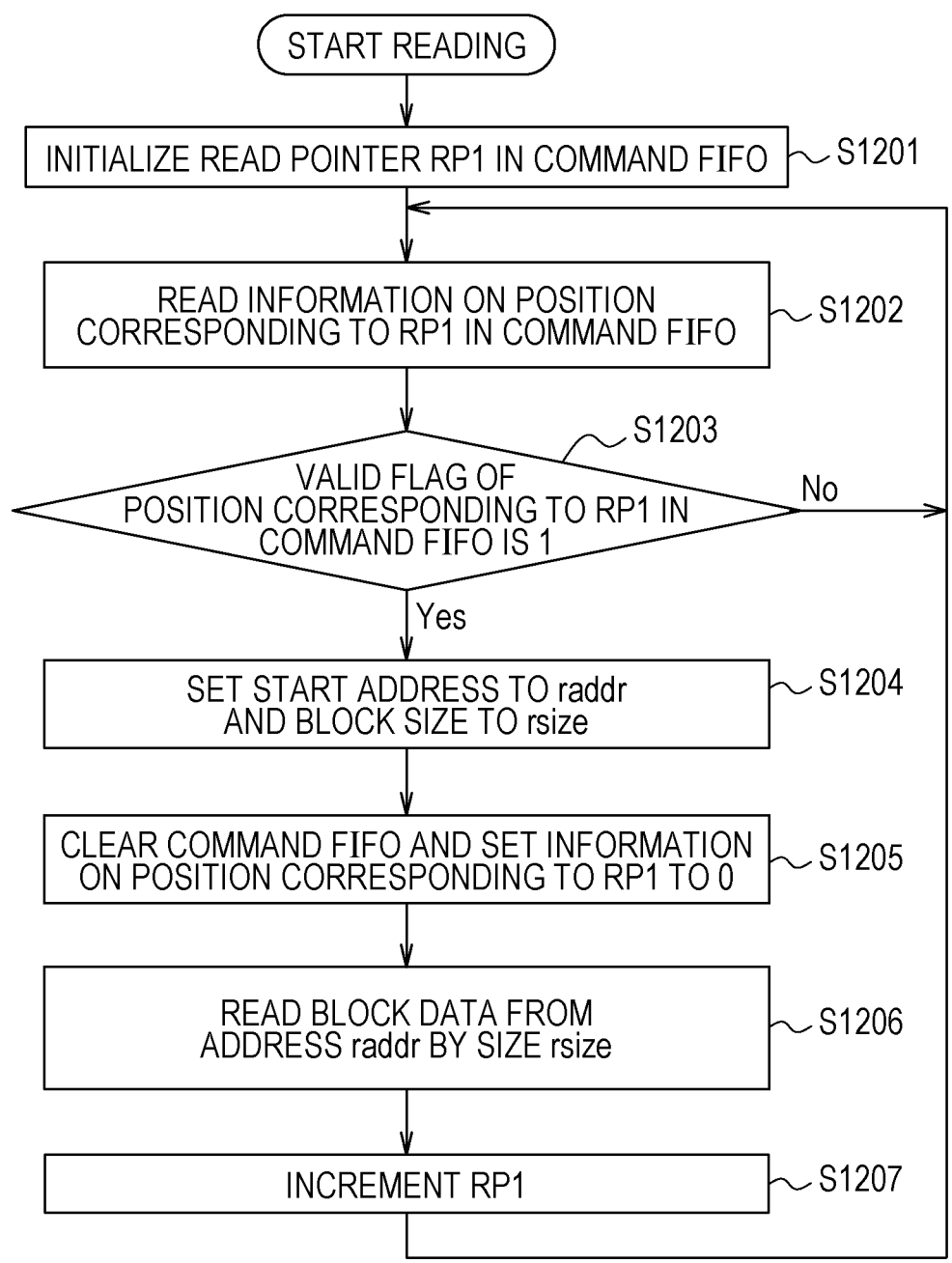
FIG. 12 is a flow chart illustrating details of read processing executed by the processor core.

FIG. 12 is a flow chart illustrating details of read processing executed by the processor core 121 of the second processor 102 in S402 in FIG. 4. In S1201, the processor core 121 stores the read pointer RP1 in the first command FIFO 132a, and initializes the read pointer RP1 in the first command FIFO 132a to 0. Next, in S1202, the processor core 121 issues a read request 821 (FIG. 8C) of the write completion information 300 on the input data in the block blk0 stored at the address in the first command FIFO 132a, which corresponds to the read pointer RP1 in the first command FIFO 132a.

The second processor 102 outputs the read request 821 to the main memory 103 via the bus 104. The main memory 103 responds to the read request 821, and reads the write completion information 300 on the input data in the block blk0 stored at the address in the first command FIFO 132a. Then, the main memory 103 outputs the write completion information 300 to the second processor 102 via the bus 104. The processor core 121 receives the write completion information 300.

Next, in S1203, the processor core 121 checks whether or not the valid flag 301 in the write completion information 300 is "1". When the valid flag 301 is "0", which represents that the input data in the block blk0 is not written in the first data area 131a, the processor core 111 returns processing to S1202.

Next, in S1202, the processor core 121 issues a read request 822 (FIG. 8C) of the write completion information 300 on the input data in the block blk0 stored at the address in the first command FIFO 132a, which corresponds to the read pointer RP1 in the first command FIFO 132a. Next, in S1203, when the valid flag 301 in the write completion information 300 is "0", which represents that the input data in the block blk0 is not written into the first data area 131a, the processor core 121 returns processing to S1202.

Next, in S1202, the processor core 121 issues a read request 823 (FIG. 8C) to the write completion information 300 on the input data in the block blk0 stored at the address in the first command FIFO 132a, which corresponds to the read pointer RP1 in the first command FIFO 132a. Next, in S1203, when the valid flag 301 in the write completion information 300 is "1", which represents that the input data in the block blk0 is written in the first data area 131a, the processor core 121 proceeds processing to S1204.

In S1204, the processor core 121 sets the block start address 302 in the write completion information 300 on the input data in the block blk0 to a read start address raddr, and sets the block size 303 in the write completion information 300 to a block size rsize.

Next, in S1205, the processor core 121 issues a write request 824 (FIG. 8C) for writing the write completion information 300 on the input data in the block blk0 having all bits of 0, at the address in the first command FIFO 132a, which corresponds to the read pointer RP1 in the first command FIFO 132a. The write completion information 300 includes the valid flag 301 of "0". The processor core 121 may issue the write request 824 for writing the write completion information 300 having the valid flag 301 of "0".

Next, in S1206, the processor core 121 issues a read request group 825 (FIG. 8C) for reading the input data in the block blk0 from the first data area 131a, based on the read start address raddr and the block size rsize. Here, the second processor 102 reads data from the main memory 103 in the unit of data length of the cache line. As illustrated in FIG. 8C, the read request group 825 of the input data in the block blk0 includes a plurality of data read requests having the data length of the cache line at consecutive addresses.

Next, in S1207, the processor core 121 increments the read pointer RP1 of the first command FIFO 132a, and returns processing to S1202.

Next, in S1202, the processor core 121 issues a read request 826 (FIG. 8C) of the write completion information 300 on the input data in the block blk1 stored at the address in the first command FIFO 132a, which corresponds to the read pointer RP1 in the first command FIFO 132a. Next, in S1203, when the valid flag 301 in the write completion information 300 is "1", which represents that the input data in the block blk1 is written in the first data area 131a, the processor core 121 proceeds processing to S1204. In S1204, the processor core 121 sets the block start address 302 in the write completion information 300 on the input data in the block blk1 to the read start address raddr, and sets the block size 303 in the write completion information 300 to the block size rsize. Next, in S1205, the processor core 121 issues a write request 827 (FIG. 8C) for writing the write completion information 300 on the input data in the block blk0, in which all bits are 0, to the address in the first command FIFO 132a, which corresponds to the read pointer RP1 in the first command FIFO 132a. Next, in S1206, the processor core 121 issues a read request group 828 (FIG. 8C) for reading the input data in the block blk1 from the first data area 131a, based on the read start address raddr and the block size rsize. As illustrated in FIG. 8C, the read request group 828 of the input data in the block blk1 includes a plurality of data read requests having the data length of the cache line at consecutive addresses. Next, in S1207, the processor core 121 increments the read pointer RP1 in the first command FIFO 132a, and returns processing to S1202. Hereinafter, similarly, the processor core 121 executes the read processing for the block blk2 and subsequent blocks.

As described above, the processor core 121 issues the read request 821 to the first command FIFO 132a, and when the write completion information 300 input in response to the read request 821 includes information that does not represent completion of writing (the valid flag 301 is "0"), repeats the processing of issuing the read requests 822 and 823 to the first command FIFO 132a. When the write completion information 300 input in response to the read request 823 includes information that represents completion of writing (the valid flag 301 is "1"), the processor core 121 issues the read request group 825 to data with the block start address 302 and the block size 303 in the write completion information 300. When the write completion information 300 input in response to the read request 823 includes information that represents completion of writing (the valid flag 301 is "1"), the processor core 121 issues the write request 824 to the write completion information 300 changed to information that does not represent completion of writing (the valid flag 301 is "0").

In S402 in FIG. 4, the barrier instruction insertion section 122 of the second processor 102 executes the request output processing as illustrated in FIG. 10A, and executes the response input processing as illustrated in FIG. 10B. In S402 in FIG. 4, the memory controller 123 of the second processor 102 executes the request output processing as illustrated in FIG. 11A, and executes the response input processing as illustrated in FIG. 11B.

In S404 in FIG. 4, the second processor 102 executes the write processing in the same manner as the first processor 101 does in S401. In S405 in FIG. 4, the first processor 101 executes the read processing in the same manner as the second processor 102 does in S402.

In FIG. 1, the information processing system 100 may omit the second processor 102. In this case, in S401 in FIG. 4, the first processor 101 executes the write processing with respect to input data, and in S402, the first processor 101 executes the read processing with respect to the input data. In S401 to S405, the first processor 101 executes all processing of the second processor 102.

The data area 131 and the command FIFO 132 each may have a fixed capacity such as 100 M bytes or 1 G bytes. The first data area 131a and the second data area 131b each may store the fixed number of blocks such as 10 blocks or 100 blocks. The information processing system 100 may dynamically change the capacities of the data area 131 and the command FIFO 132 according to free time of the command FIFO 132.

If the barrier instruction insertion section 112 buffers a memory access history, and inserts the barrier instruction based on the memory access history, barrier instruction insertion conditions become complicated, increasing power consumption to deteriorate latency. In this embodiment, the barrier instruction insertion section 112 inserts the barrier instructions 811 to 813 immediately prior to the write requests 803, 806, and 809 to the write completion information 300, respectively, decreasing power consumption to improve latency.

Second Embodiment

Figure 13:
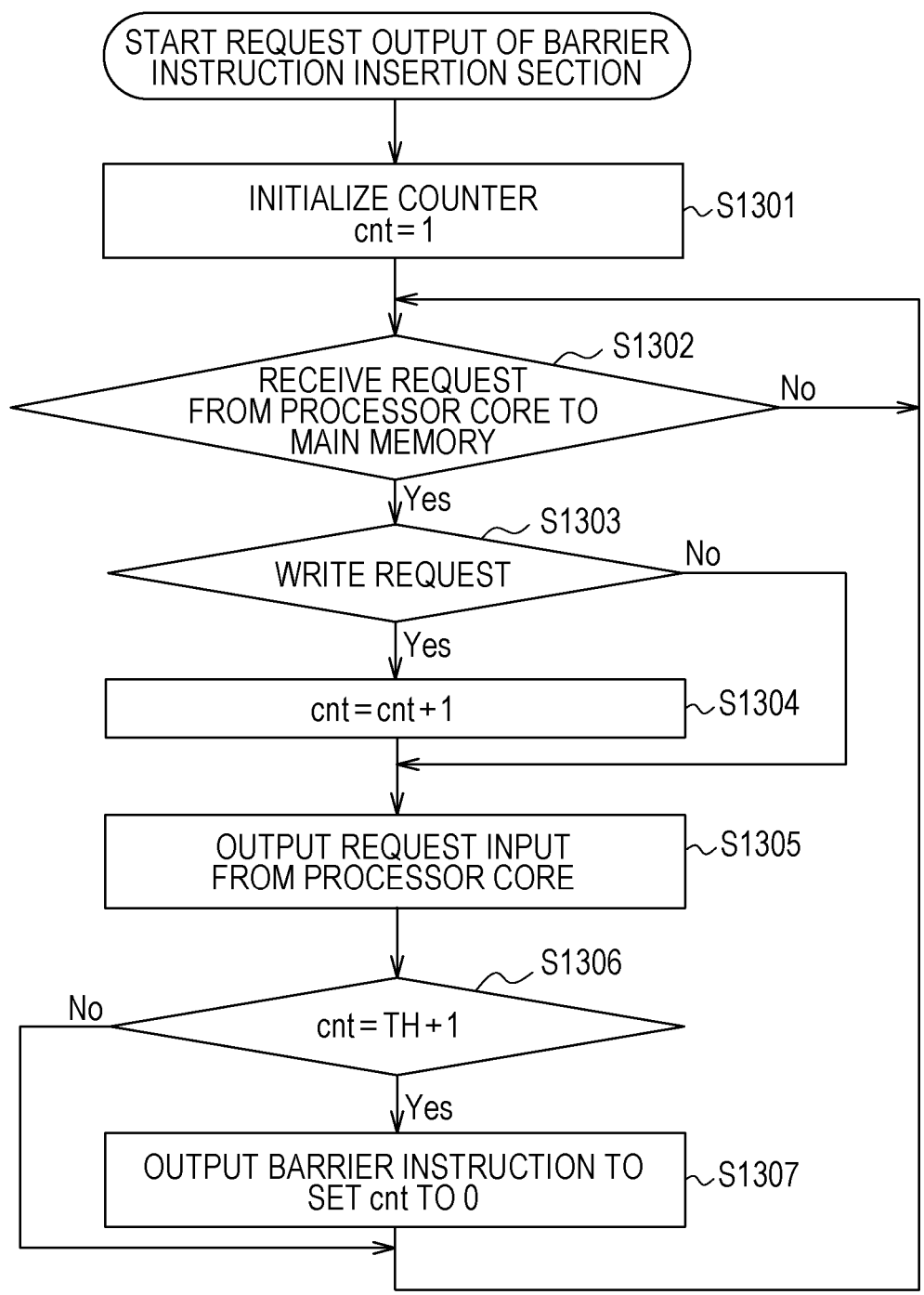
FIG. 13 is a flow chart illustrating details of request output processing executed by a barrier instruction insertion section in accordance with a second embodiment.

FIG. 13 corresponds to FIG. 10A, and is a flow chart illustrating details of request output processing executed by the barrier instruction insertion section 112 in accordance with a second embodiment. Differences between the information processing system 100 in the second embodiment and the information processing system 100 in the first embodiment will be described below. The barrier instruction insertion section 112 executes the processing in FIG. 13 in place of the processing in FIG. 10A. In this embodiment, input data in all blocks has the same size. That is, the size of the input data in the block blk0 is the same as the size of the input data in the block blk1. In this case, in FIG. 8A, the number of the plurality of write requests in the write request group 802 is acquired by dividing the size of the input data in the block blk0 by data length of a memory cache, that is, a number of requests TH1. The number of a plurality of write requests in the write request group 805 is acquired by dividing the size of the input data in the block blk1 by data length of a memory cache, that is, the number of requests TH1. The number of a plurality of write requests in the write request group 808 is acquired by dividing the size of the input data in the block blk2 by data length of a memory cache, that is, the number of requests TH1. The number of write requests in the write request groups 802, 805, and 808 is the same number of requests TH1. Although processing of the barrier instruction insertion section 112 will be described below as an example, processing of the barrier instruction insertion section 122 is the same as the processing of the barrier instruction insertion section 112.

In S1301, the barrier instruction insertion section 112 initializes a counter value cnt to 1. Next, in S1302, the barrier instruction insertion section 112 waits until receipt of a request issued by the processor core 111 to the main memory 103, and proceeds processing to S1303 at receipt of the request.

In S1303, the barrier instruction insertion section 112 checks whether or not the input request is the write request.

The barrier instruction insertion section 112 proceeds processing to S1304 when the input request is a write request, and proceeds processing to S1305 when the input request is not a write request. In S1304, the barrier instruction insertion section 112 increments the counter value cnt, and proceeds processing to S1305. In S1305, the barrier instruction insertion section 112 outputs the request input from the processor core 111 to the memory controller 113.

Next, in S1306, the barrier instruction insertion section 112 checks whether or not the counter value cnt is TH+1. TH is the number of write requests in each of the write request groups 802, 805, and 808. The barrier instruction insertion section 112 proceeds processing to S1307 when the counter value cnt is TH+1, and returns processing to S1302 when the counter value cnt is not TH+1. In S1307, the barrier instruction insertion section 112 outputs the barrier instruction to the memory controller 113, sets the counter value cnt to 0, and returns processing to S1302.

In FIGS. 8A and 8B, when the read request 801 is issued, the barrier instruction insertion section 112 outputs the read request 801 without incrementing the counter value cnt. Next, when a plurality of write requests in the write request group 802 are issued, the barrier instruction insertion section 112 increments the counter value cnt, and outputs the plurality of write requests in the write request group 802. The counter value cnt becomes TH+1, and the barrier instruction insertion section 112 outputs the barrier instruction 811, and sets the counter value cnt to 0.

Next, when the write request 803 is issued, the barrier instruction insertion section 112 increments the counter value cnt, and outputs the write request 803. Next, when the read request 804 is issued, the barrier instruction insertion section 112 outputs the read request 804 without incrementing the counter value cnt. Next, when a plurality of write requests in the write request group 805 are issued, the barrier instruction insertion section 112 increments the counter value cnt, and outputs the plurality of write requests in the write request group 805. The counter value cnt becomes TH+1, and the barrier instruction insertion section 112 outputs the barrier instruction 812, and sets the counter value cnt to 0.

Next, when the write request 806 is issued, the barrier instruction insertion section 112 increments the counter value cnt, and outputs the write request 806. Next, when the read request 807 is issued, the barrier instruction insertion section 112 outputs the read request 807 without incrementing the counter value cnt. Next, when a plurality of write requests in the write request group 808 are issued, the barrier instruction insertion section 112 increments the counter value cnt, and outputs the plurality of write requests in the write request group 808. The counter value cnt becomes TH+1, the barrier instruction insertion section 112 outputs the barrier instruction 813, sets the counter value cnt to 0. Next, when the write request 809 is issued, the barrier instruction insertion section 112 increments the counter value cnt, and outputs the write request 809.

In this embodiment, the barrier instruction insertion section 112 counts the number of write requests issued by the processor core 111 as the counter value cnt, and inserts the barrier instructions 811 to 813 according to the number of counted write requests.

The first processor 101 and the second processor 102 may execute the processing in FIGS. 9 to 13 by using hardware or software. The first processor 101 and the second processor 102 each may perform a program stored in the main memory 103 to execute the processing in FIGS. 9 to 13.

The first and second embodiments may be implemented by allowing a computer to perform a program. In addition, a computer-readable recording medium that records the above-described program and a computer program such as the above-described program may be also applied as the embodiments of the present disclosure. Examples of the recording medium include a flexible disc, a hard disc, an optical disc, a magneto-optical disc, a CD-ROM, a magnetic tape, a non-volatile memory card, and ROM.

The above embodiments are merely specific examples in implementing the present disclosure, and not interpreted so as to limit the technical scope of the present disclosure. That is, the present disclosure may be implemented in various forms without departing from its technical concept or main features.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
a memory including a data area and a completion information area; and
a first processor coupled to the memory, the first processor configured to:
issue a first write request group including a plurality of data write requests for writing first data to the data area;
issue a first completion write request after issuing the first write request group, the first completion write request being a request for writing completion information to the completion information area, the completion information indicating completion of write processing requested by the first write request group;
insert a first barrier instruction between the first write request group and the first completion write request; and
control output of the first write request group, the first completion write request, and the first barrier instruction to the memory by outputting all of the plurality of data write requests included in the first write request group, subsequently outputting the first barrier instruction, and subsequently outputting the first completion write request, the plurality of data write requests being output through an out-of-order execution in which the plurality of data write requests are reordered, wherein
the plurality of data write requests request to write the first data at consecutive addresses,
the completion information includes validity information indicative of validity of the completion information, a start address of a data block in which the first data is written, and a data size of the data block,
the plurality of data write requests request to write the first data at addresses of the data area,
the first completion write request requests to write the completion information at an address of the completion information area, and the first processor is configured to:
issue a first read request requesting to read first completion information from the completion information area;
repeat the issuing of the first read request when first validity information included in the first completion information indicates that the first completion information is invalid; and
issue a second read request when the first validity information indicates that the first completion information is valid, the second read request requesting to read data having the data size included in the first completion information from the start address included in the first completion information.

2. The information processing system according to claim 1, wherein
the first processor is configured to:
issue, when the first validity information indicates that the first completion information is valid, a write request requesting to write the first completion information in which the first validity information is changed to indicate that the first completion information is invalid.

3. An information processing system, comprising:
a memory including a data area and a completion information area; and
a first processor coupled to the memory, the first processor configured to:
issue a first write request group including a plurality of data write requests for writing first data to the data area;
issue a first completion write request after issuing the first write request group, the first completion write request being a request for writing completion information to the completion information area, the completion information indicating completion of write processing requested by the first write request group;
insert a first barrier instruction between the first write request group and the first completion write request; and
control output of the first write request group, the first completion write request, and the first barrier instruction to the memory by outputting all of the plurality of data write requests included in the first write request group, subsequently outputting the first barrier instruction, and subsequently outputting the first completion write request, the plurality of data write requests being output through an out-of-order execution in which the plurality of data write requests are reordered
wherein
the plurality of data write requests request to write the first data at consecutive addresses,
the completion information includes validity information indicative of validity of the completion information, a start address of a data block in which the first data is written, and a data size of the data block,
the plurality of data write requests request to write the first data at addresses of the data area,
the first completion write request requests to write the completion information at an address of the completion information area, and
the information processing system further comprises:
a first information processing apparatus including the first processor; and
a second information processing apparatus different from the first information processing apparatus, the second information processing apparatus including:

a second processor coupled to the memory and the second processor configured to:

output a first read request to the memory, the first read request requesting to read first completion information from the completion information area;

repeat the outputting of the first read request when first validity information included in the first completion information indicates that the first completion information is invalid; and output a second read request to the memory when the first validity information indicates that the first completion information is valid, the second read request requesting to read data having a data size included in the first completion information from a start address included in the first completion information.

4. The information processing system according to claim 3, wherein the first processor is configured to:

issue, when the first validity information indicates that the first completion information is valid, a write request requesting to write the first completion information in which the first validity information is changed to indicate that the first completion information is invalid.

5. The information processing system according to claim 1, wherein the plurality of data write requests request to write the first data at addresses of the data area, the first completion write request requests to write the completion information at an address of the completion information area, and the first processor is configured to:

determine, when a request for writing data at any address of the completion information area is issued, that the issued request is the first completion write request.

6. The information processing system according to claim 1, wherein the first processor is configured to:

count a number of issued write requests; and issue the first barrier instruction when the counted number reaches a predetermined number.

7. The information processing system according to claim 1, wherein the first processor is configured to:

issue a second write request group including a plurality of data write requests after issuing the first completion write request;

issue a second completion write request after issuing the second write request group, the second completion write request requesting to write completion information indicating completion of write processing requested by the second write request group;

insert a second barrier instruction into the requests issued after the first completion write request, between the second write request group and the second completion write request; and control output of the second write request group, the second completion write request, and the second barrier instruction to the memory by outputting all of the plurality of data write requests included in the second write request group, subsequently outputting the second barrier instruction, and subsequently outputting the second completion write request, the plurality of data write requests included in the second write request group being output through the out-of-order execution.

8. A non-transitory computer-readable recording medium having stored therein a program that causes a computer to execute a process, the process comprising:

issuing a first write request group including a plurality of data write requests for writing first data to a data area of a memory;

issuing a first completion write request after issuing the first write request group, the first completion write request being a request for writing completion information to a completion information area of the memory, the completion information indicating completion of write processing requested by the first write request group;

inserting a first barrier instruction between the first write request group and the first completion write request; and controlling output of the first write request group, the first completion write request, and the first barrier instruction to the memory by outputting all of the plurality of data write requests included in the first write request group, subsequently outputting the first barrier instruction, and subsequently outputting the first completion write request, the plurality of data write requests being output through an out-of-order execution in which the plurality of data write requests are reordered, wherein the plurality of data write requests request to write the first data at consecutive addresses, the completion information includes validity information indicative of validity of the completion information, a start address of a data block in which the first data is written, and a data size of the data block, the plurality of data write requests request to write the first data at addresses of the data area, the first completion write request requests to write the completion information at an address of the completion information area, and issuing a first read request requesting to read first completion information from the completion information area;

repeating the issuing of the first read request when first validity information included in the first completion information indicates that the first completion information is invalid; and issuing a second read request when the first validity information indicates that the first completion information is valid, the second read request requesting to read data having the data size included in the first completion information from the start address included in the first completion information.

* * * * *